April 17, 1945.  F. H. McBERTY  2,374,114
FILTERING APPARATUS AND PROCESS
Filed Aug. 20, 1942
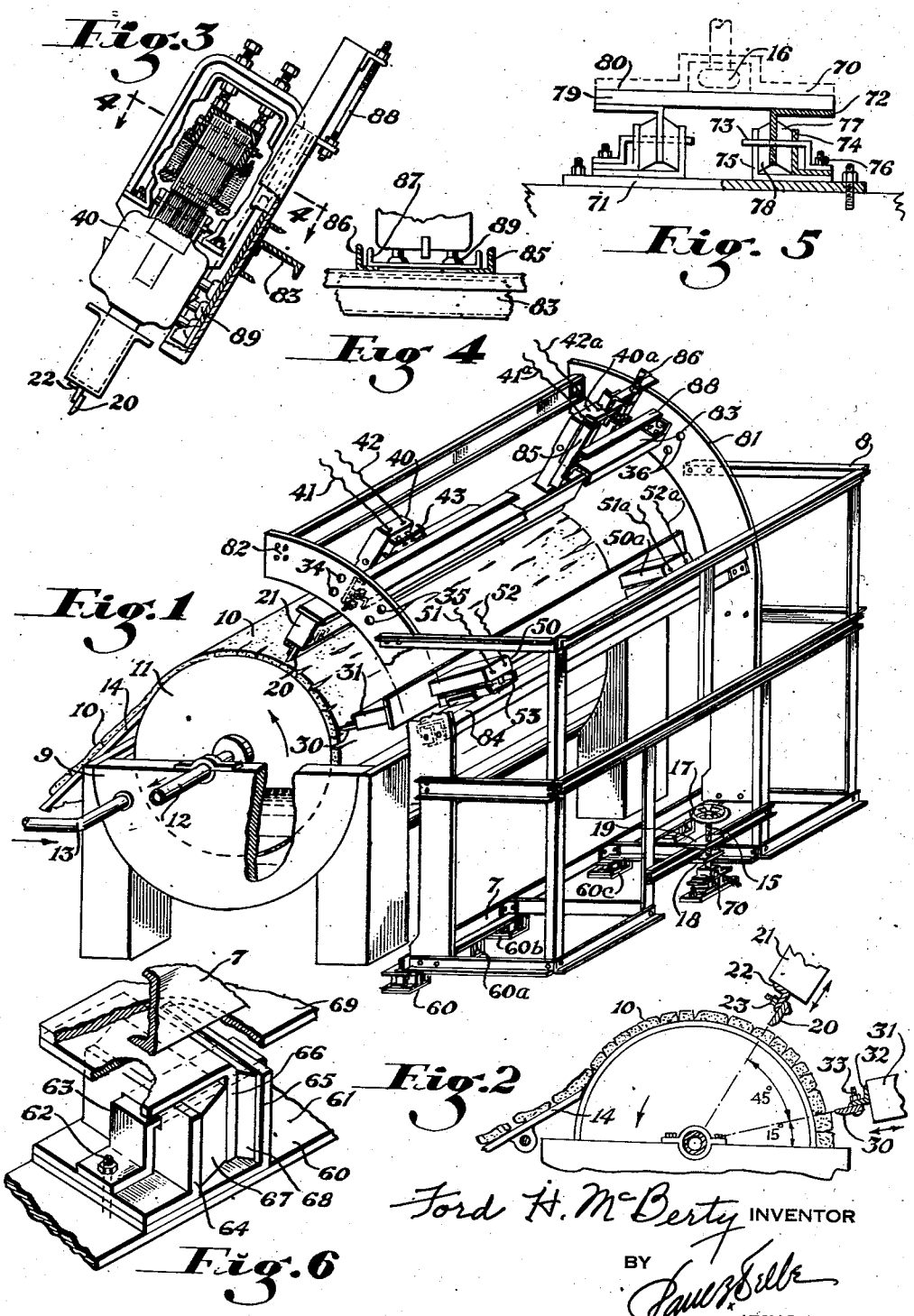

Patented Apr. 17, 1945

2,374,114

UNITED STATES PATENT OFFICE 2,374,114

FILTERING APPARATUS AND PROCESS

Ford H. McBerty, Newark, Del., assignor to E. I. du Pont de Nemours & Company, Wilmington, Del., a corporation of Delaware Application August 20, 1942, Serial No. 455,427

7 Claims. (Cl. 210—201)

This invention relates to filtration, especially to increasing the efficiency of continuous vacuum filters. More particularly it appertains to means and ways of decreasing the amount of residual liquor in filter cakes on continuous rotary vacuum filters.

In the manufacture of white pigments such as titanium dioxide (U. S. A. Patents Re. 18,790 to Mecklenberg and Re. 18,854 to Blumenfeld), lithopone, zinc sulfide, etc., it is common practice to precipitate the desired compound and filter the same on a continuous vacuum filter before calcining. Heretofore "cracking" of the cake, and consequent poorer vacuum, has been a feature in the operation of such filters, particularly those of the Oliver type (Handbook of Ore Dressing—Taggart—1927, pages 1002-8). The resulting excess of water remaining in the fissured cake had to be removed in the more expensive steps of drying and calcining.

The primary object of this invention was to prevent the early weakening or loss of vacuum in drum filters. Another important object was to decrease the amount of fuel (oil) needed to prepare a titanium dioxide pigment from the precipitate freed by hydrolysis of the titanium solution. Other objects were to increase the efficiency of continuous vacuum filters; to decrease the amount of liquid in the cake from continuous drum filters; to decrease the cost of calcining pigments; to compact the cake on continuous filters; to close up the gaps or fissures in filter cakes created by the removal of filtrate through the filter drums; to improve the filter cake seal on vacuum filters; and to puddle the liquor out of continuous filter cakes. A general advance in the art, and other objects which will appear hereinafter, are also contemplated.

It has now been found that the application of a rapidly vibrating bar across the surface of a continuous filter cake during the removal of the mother liquor therefrom, in the manner described in detail hereinafter, increases the efficiency of the filter, reduces the amount of liquid in the cake, and lessens the cost of calcining the cake.

How the foregoing objects and related ends are accomplished will be apparent from the following exposition, in which are disclosed the principle and divers embodiments of the invention, including the best mode contemplated for carrying out the same. The written description is amplified by the accompanying drawing, in which:

Figure 1 is a somewhat diagrammatic perspective view of a conventional continuous vacuum drum filter equipped with the vibrating bar puddling device of this invention;

Figure 2 is an end elevation view, showing the angular relation of the vibrating bars;

Figure 3 is an end elevation view, partly in section, of one of the vibrating units and its support;

Figure 4 is a sectional view along the line 4—4 in Figure 3;

Figure 5 is a fragmentary side elevation view, partly in section, of the anchor for the adjusting screw used to tilt the frame which supports the vibrating blades, and Figure 6 is a perspective view, partly in section, of one of the supports for the pivot edge of the frame.

Similar characters indicate similar parts throughout the drawing.

Referring now to Figure 1, there is indicated generally at 9 a continuous vacuum drum filter, above which a frame of structural steel, generally indicated at 8, supports vibrating bars or blades 20 and 30. The frame has a generally rectangular base, fulcrumed or pivoted on a series of resilient supports 60, 60a, 60b, 60c, etc., along one edge. The opposite edge is adjustably anchored through a resilient support, generally indicated at 70.

The frame overhangs in an arcuate fashion the filter drum 11, and the overhanging portion carries cross vibration-unit supports 83 and 84. These supports are T-shaped structural units built up (by welding) of ordinary steel channel sections positioned at right angles to each other. The stems of the T's are riveted to suitable angle brackets which in turn are bolted to the frame side members 81 and 82. A series of holes 34, 35, 36 et alii in the side pieces provides for changes in location of the brackets.

The vibrating blades 20 and 30 are preferably Monel metal strips of rectangular cross-section about 0.5 inch thick and 3 to 4 inches wide, secured to angle pieces 22 and 32 by means of nuts and bolts 23 and 33. The angle strips 22 and 32 are permanently secured to the box section cross-heads 21 and 31. An additional angle piece on the opposite side of the blade may be utilized, if desired. Each cross-head is carried by two vibrator units, 21 by units 40 and 40a and 31 by units 50 and 50a. The vibrators are cradled on the supports 83 and 84. The wiring for these units is shown at 41, 42, 41a and 42a. Preferably the vibrating bars are vibrated by electrically operated units, but equivalent means actuated by air, steam, etc., may be employed if desired.

As is well known to those skilled in the art, the slurry or suspension to be filtered is supplied to the tank underneath the rotating drum 11, for example through feed line 13, and the filter cake is scraped off the drum by scraper blade 14. The vacuum is applied to the interior of the drum through a hollow axle 12 leading to suction boxes fixed to the inside of the drum. As the filter cake is built up in thickness and the mother liquor removed therefrom, fissures or channels are formed which allow the surrounding air to pass through the cake, with the result that the vacuum is broken or weakened on that section of the periphery of the drum where the channeling occurs before all possible filtrate is removed.

Vibration of the blades 20 and 30 in a radial direction brings about a puddling action which obviates the already formed or potential fissure simultaneously with a compacting of the cake. Ordinarily the travel of the blades is not more than ⅛ inch. The relative proportions in Figure 2 have, as will be obvious, been exaggerated for the purpose of illustrating the effect on the filter cake. The relative positioning of the blades about the drum is not limited to the 15° and 60° positions (from horizontal) shown in the drawing. Various factors, including the points of application and removal of vacuum in the circular path through which the drum surface travels, the location of the filter, the type of vibrating blade support available, etc., determine the locations.

The structure of the supporting frame is not critical and may be varied to suit the space and material limitations encountered. The frame illustrated is built up of conventional channel and angle irons and side plates. In some instances cross bracing of this type of frame will be found helpful.

There is no need to burden this specification with details of the drum filter. These are well known to those skilled in the art.

In Figure 1 the vibrators have been conventionalized for the sake of clearness. Details of the construction and operation of these vibrator unit devices are also well-known to those skilled in the art.

The method of supporting the vibrator units has a peculiar relation to the present invention, and a description of a typical arrangement is in order. Referring to Figure 4, it will be seen that the cross support 83 has welded thereto a frame (parts omitted in Figure 1) comprising angles 85 and 86 extending radially toward the filter drum. A cradle 87 is secured to these channels by clamping bolts. Slots in the cradle and/or angle frame permit adjustment of the position of the cradle. By means of the supporting bolt 88 (Figure 3) the radial distance of the blade 20 from the filter drum can be regulated. This bolt moves the cradle to and from the surface of the drum for adjustment of the blade clearance. When the proper position has been reached, the bolts joining the cradle and the angle frame members 85 and 86 are tightened to maintain the adjustment.

Brackets on the cradle and on the upper part of the frame comprising the angles 85 and 86 provide apertures for locating the said bolt 88. The vibrator unit is secured to the cradle by means of rubber cushioning units such as 89. These units can be of the type of the cushioning unit shown in Figure 5, or can be conventional bolts having molded rubber covers or any other desirable arrangement.

The cushioning unit shown in Figure 5 comprises a bed plate 71 bolted to the concrete floor. To this are secured opposed connections comprising an angular member 72 slotted to receive the offset bar 73 which, together with the angular members 74 and 75, is secured to the plate 70 by nut and bolt 76. Rubber units 77 and 78, also slotted to receive the lateral piece 73, separate and cushion the piece 72 between the uprights 74 and 75. Another plate 79 and the cover frame 80 are welded to the angles such as 72, to form an integral unit which receives the rounded head 16 of the screw 15. Movement of the hand wheel 17 raises or lowers the outside of the frame, causing said frame to pivot about the units 60. This follows because the screw 15 is threaded through a trunnion-like member which is a part of and free to rock in the frame 8. Movement of the frame gives an equal radial movement of the blades toward or from the center of the drum.

Resilient pivots 60 on the side of the frame opposite the aforementioned hand wheel, have a construction similar to that just described. There the plate 61 is bolted to the floor, and a bolt 62 secures the lateral member 63 and the two upright members 64 and 65 to the said plate 61. The rubber units which cushion the angle member 66 are shown at 67 and 68. The intermediate plate 69 is joined to this angle piece 66 and channel 7 of the frame 8.

As previously pointed out, it may be desirable to add angular braces to the frames for the purpose of increasing rigidity. Similarly, the side members 81 and 82 may have secured thereto laterally extending flanges to give a unit of angular cross-section for the same purpose. Triangular plates extending across the angle of such pieces will still further improve the structural rigidity of the frame.

The vibrating bar or blade is preferably, though not necessarily, thin. A thin blade gives a better puddling action. The vibration should be of high enough frequency to assure puddling of all portions of the cake as it travels underneath the vibrating blade.

In the preferred mode of operation the vibrating blade does not move upward, during its vibration, far enough to lose contact with the filter cake. It may, therefore, be better to define the action on the cake as shaking, tamping or vibrating, rather than a tapping, which latter term might indicate that the blade separates from the cake on the upstroke. The vibrating blade acts somewhat as a doctor knife does in coating operations, in that a small roll of the cake material piles up back of the blade.

Vibration speeds upwards of 15 per second are utilized. Preferably high frequencies, for example 60 strokes per second, are employed.

Many advantages of the present invention will be apparent from the foregoing. Particular attention should be called to the important decrease in the amount of fuel necessary to finish a pigment filtered with the apparatus of this invention. In addition, it will be noted that the auxiliary apparatus employed to improve filtration is simple in character, positive in action and economical in operation.

As many apparently widely different embodiments of this invention may be made without departing from the spirit and scope thereof, it is to be understood that this invention is not limited to the specific embodiments thereof except as defined in the appended claims.

I claim:

1. In the process of removing liquid from a continuous suction filter cake, the step of subjecting the cake to simultaneous suction and shaking with a contacting narrow knife the knife edge portion of which continuously engages said cake, and is adapted to be moved upward and downward in a radial direction at 60 strokes per second without separating from the cake.

2. Filtration apparatus comprising in combination a rotary vacuum drum filter carrying a layer of filter cake, a bladed puddling element for said cake operatively disposed with respect to said filter the bladed thin edge portion of which is in contact with said cake, and means for automatically imparting a vibratory movement to said element whereby the bladed portion thereof will exert a puddling action on said cake.

3. Filtration apparatus comprising in combination a rotary vacuum drum filter carrying a layer of filter cake, a bladed puddling element for said cake operatively disposed with respect to said filter the bladed thin edge portion of which is in direct contact with said cake, and electroresponsive means associated with said puddling element for imparting a vibrating movement to said element and a consequent puddling action by the blade portion thereof on said cake.

4. Filtration apparatus comprising in combination a rotary vacuum drum filter carrying a layer of filter cake, an arcuate frame cooperatively arranged with and overhanging said drum and cake provided with transverse supporting members carrying electrical vibrator units, blade members having their knife edge portions in continuous contact with said cake and secured to said vibrator units, whereby the latter upon being energized imparts a vibrating action to said blades in a restricted radial direction to exert a puddling action on said cake.

5. A method for increasing filtrate removal from a filter cake disposed on a continuous vacuum filter, comprising puddling said cake along a narrow, transverse area while applying suction thereto, and effecting said puddling through the action of a continuously vibrating blade element having a thin edge portion maintained in continuous contact with said cake throughout said puddling action.

6. A method for increasing filtrate removal from a filter cake disposed on the continuous vacuum filter, comprising puddling said cake along a narrow, transverse area while applying suction thereto, and effecting said puddling through the action of a continuously vibrating blade element operating at a frequency above 15 strokes per second, a thin edge portion of said blade element being maintained in continuous contact with said cake throughout said puddling action.

7. An apparatus for improving liquor removal from the cake of a continuous vacuum filter which comprises in combination with said drum type filter a vibrating bar provided with a blade member, the restricted edge portion of which blade member is operatively disposed for continuous contact with and adapted to tap the cake while it is under vacuum, and means for vibrating said bar.

FORD H. McBERTY.